March 25, 1952  E. A. HECKMAN ET AL  2,590,246
APPARATUS FOR WINDING STRANDS ON ARTICLES
Filed Oct. 18, 1949
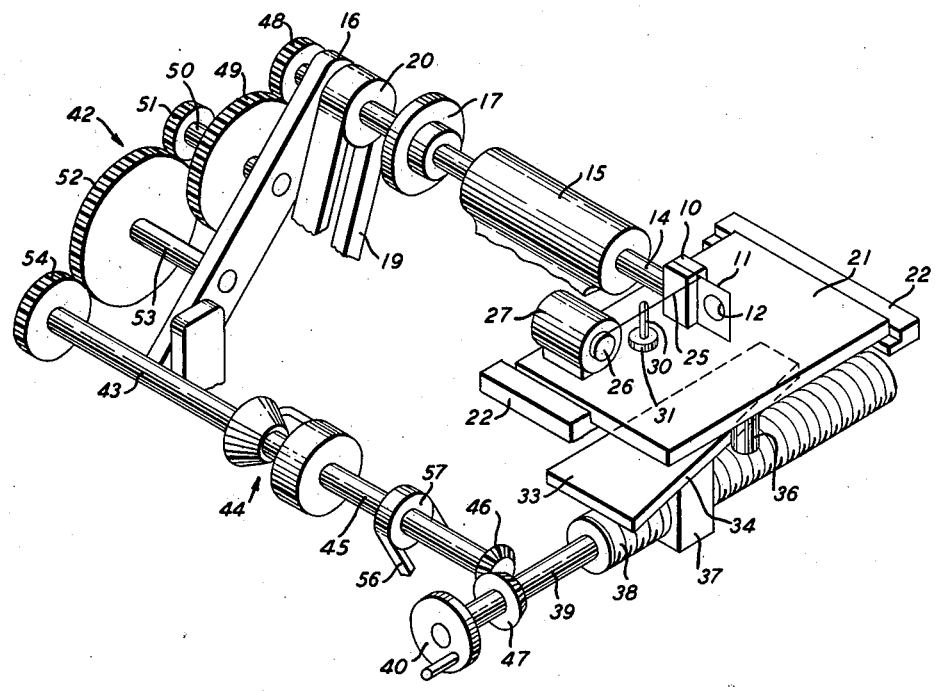
INVENTORS
E.A.HECKMAN
J.J.KLING
BY *lw.e.Parnell*
ATTORNEY Patented Mar. 25, 1952

2,590,246

UNITED STATES PATENT OFFICE 2,590,246

APPARATUS FOR WINDING STRANDS ON ARTICLES

Edward A. Heckman and John J. Kling, Allentown, Pa., assignors to Western Electric Company, Incorporated, New York, N. Y., a corporation of New York Application October 18, 1949, Serial No. 122,066

3 Claims. (Cl. 242—7)

This invention relates to apparatus for winding strands on articles, and more particularly to fine pitch grid lathes for winding vacuum tube grids.

A particular type of vacuum tube grid designed for use in the art of telephony is composed of a grid frame less than one-half inch square and less than $\frac{1}{16}''$ in thickness upon which a fine strand, such as tungsten wire from .0003 to .0005 of an inch in diameter, is spirally wound. In the formation of the grid, there may be hundreds of turns per inch and, for example, in a grid having 2500 turns per inch, the requirements are that a normal pitch of .0004 of an inch shall have a maximum variation in pitch of .00004 of an inch.

In addition to the general problems of winding strands on articles or winding the former types of grids for use in vacuum tubes, there existed the problem of winding an exceedingly fine wire on a flat article or grid frame as the article rotated about a fixed axis. Not only was the tensioning of the wire a problem for consideration, but more important, the accurate spacing of the turns or convolutions of wire on the grid frame. The wire being so fine, and the required pitch for the spiral winding of the wire, namely the distance required between each turn of the wire being so small, a highly accurate mechanism capable of producing these results, was necessary.

An object of the invention is to provide a strand winding machine which is simple in structure, yet highly efficient in accurately winding a fine strand on an article during rotation of the article.

With this and other objects in view, the invention comprises a strand winding machine having means for rotating an article about a fixed axis and a carriage for supporting a supply of strand material to be wound on the article, a tensioning means therefor and a distributor arm movable simultaneously with the carriage to uniformly distribute the strand material on the article.

More specifically the machine includes a table-like carriage mounted to be moved in a given path relative to the rotating article by a straight surface cam actuated by a feed screw operatively connected to a driving mechanism.

Other objects and advantages will be apparent from the following detailed description when considered in conjunction with the accompanying drawing which shows a schematic isometric view of the winding machine.

The present embodiment of the invention as shown in the drawing includes a quill type mandrel 10 to grip an article 11 which is a grid frame substantially square in general contour and having an aperture 12 therein. The mandrel 10 is supported by a spindle 14 journalled in suitable bearings in a stationary housing 15 and a suitable bearing mounted in a frame 16. The spindle 14 has a hand wheel 17 mounted thereon for use in adjusting the spindle to a starting position or to a position convenient for the opening and closing actuation of the mandrel 10. The spindle 14 is driven by a suitable power means (not shown) connected to the spindle through a belt 19 and pulley 20.

A table-like carriage 21, supported by parallel guides 22 for movement in a given path relative to the mandrel 10, supports the strand material as well as the tensioning mechanism therefor and the distributing element. The strand material is indicated at 25 and is withdrawn from a supply reel 26 removably mounted on the shaft of a drag cup motor 27 which is fixedly mounted on the carriage. The motor 27 is of the type disclosed in the copending application of J. A. Morton, Serial No. 775,733, filed September 23, 1947, now Patent No. 2,566,848, dated September 4, 1951, to maintain a constant given tension in the strand material. A distributor element 30 which in the present embodiment is a sapphire guide mounted in a chuck 31 between the supply reel 26 and the spindle 14 on the table 21, moves with the carriage to distribute the strand material on the article 11. The element 30, the supply reel 26 and the tension motor 27 are so positioned with respect to the article 11 that the material travels from the supply to the article in as nearly a straight line as possible with only minute variations in the angularity of the wire, resulting from the width of the wound area of the wire on the supply, to effect smooth traveling of the wire between the supply and the article.

The very close and uniform spacing of the convolutions of the wire or strand material on the grid frame 11 is obtained by the use of a cam 33 with a straight surface 34 having a cam rise of one inch in fifteen inches. The cam surface 34 is positioned to engage a pin-like follower 36 supported by the carriage 21 and extending downwardly from its under surface. The cam 33 is supported by an internally threaded element 37 which is especially machined with a feed screw 38. The screw 38 is mounted on a shaft 39 which carries a hand wheel 40 for manual adjustment of the screw if such is necessary.

During the winding operation, the shaft 39 is driven from the main power supply through the belt and pulley connection 19—20, a train of gears indicated generally at 42, through a shaft 43, a clutch 44, a shaft 45 and bevel gears 46 and 47. The gears 42 are commercially known as change gears implying that gears of different types may be interposed between the spindle 14 and the shaft 43 depending upon the speeds of rotation required therefor. In the present instance, a pinion 48 is mounted on the spindle 14 and interengages a gear 49 supported by a shaft 50 supported by the frame 16. A pinion 51, also mounted on the shaft 50, drives a gear 52 rotatably mounted on a shaft 53 supported by the frame 16. The gear 52 interengages the pinion 54 mounted on the shaft 43 whereby the shaft 43 will be driven at a given speed relative to the speed of the spindle 14. The clutch 44 in the present instance is a solenoid operated clutch for connecting or disconnecting the shafts 43 and 45. Normally, the clutch 44 is operated into closed position, but after the completion of the winding operation, it is desirable to have a quick return of the distributing mechanism including the carriage, the units supported thereby and the mechanism employed in moving the carriage. The carriage may be returned to its starting position by a spring, but the cam 33 must be returned to its starting position by opening of the clutch 44 to drive the shaft 45 in a reverse direction through a belt 56 and pulley 57.

Prior to the operation of the machine, the article 11 or grid frame is mounted in the mandrel 10 with the carriage 21 at its starting position. The strand material or wire 25 is threaded in front of the distributor element 30 and has its leading end secured in a conventional manner to the article. The tensioning unit or motor 27 is energized, after which the spindle 14 is rotated at a given speed driving the distributing mechanism in synchronism therewith. In other words, as soon as the spindle 14 begins its rotation, the main driving means for the spindle 14 and the feed screw 38 causes rotation of the feed screw to move the cam 33 relative to the follower 36 to impart movement at a given speed to the carriage whereby the supply 26 for the material 25 and the tensioning unit 27 are moved uniformly with the distributing element 30 to distribute the convolutions of the strand material uniformly on the article. If desired, a suitable spring means may be employed to urge the carriage toward its starting position and to hold the follower 36 in engagement with the cam surface 34. The operation of the machine continues until the desired number of windings have been formed on the article, after which the main driving means identified by the belt and pulley connection 19—20 with the spindle 14 may be de-energized or stopped, after which the auxiliary or reverse driving means identified by the belt and pulley connection 56—57 with the shaft 45, may be energized to return the distributing mechanism to its starting position. In actual structure, the main and auxiliary driving means are electrical motors, the main motor being under the control of start and stop switches in addition to limit switches controlled by the cam 33 or the carriage 21. Furthermore, the carriage may be provided with a suitable stop to locate it in its starting position.

The important features of this machine enable it to accurately wind exceedingly fine wire on a flat article by mounting the supply for the strand material, the tensioning means for the material and also the distributor element on a single carriage for movement in unison during the winding operation to minimize angular variations in the path of the wire between the supply and the article and therefore eliminating a condition which would exist if the supply and tensioning means were mounted on stationary supports away from the table and greatly vary the tension on the wire and possible result in breaking the wire. Another important factor lies in the accuracy of the carriage moving means which is embodied in the straight surface 34 of the cam 33 and the ratio of the rise in the cam surface to make possible the fine and accurate spacing of the convolutions of the wire on the article.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A machine for winding strand material on an article comprising rotating means to support and rotate the article about a fixed axis, a carriage supported for movement in a given path relative to the article between a starting position and a stopping position, a supply of strand material rotatably supported at a given position on the carriage, a tensioning unit mounted on the carriage for creating a given tension in the strand material during winding of the material on the article, a distributor element mounted on and movable with the carriage, a straight surface cam movable relative to the carriage, a follower supported by the carriage to engage the cam, and means to move the cam at a given speed in synchronism with the rotary speed of the article to move the carriage to simultaneously move the distributor element, the supply and the tension unit to uniformly distribute the material on the article.

2. A machine for winding strand material on an article comprising rotating means to support and rotate the article about a fixed axis, a carriage supported for movement in a given path relative to the fixed axis and the article between a starting position and a stopping position, a supply reel of the strand material rotated in a given direction by the pull of the material off the reel during winding of the material on the article, an induction motor mounted on the carriage with a shaft having the supply reel fixedly mounted thereon and adapted for counter-revolution operation with respect to the given direction of rotation of the supply reel to create a desired tension in the strand material, a distributor element mounted on and movable with the carriage to distribute the strand material on the article, and means to move the carriage at a given rate of speed during rotation of the article to move the carriage to simultaneously move the distributor, the tension motor and the supply reel to uniformly distribute the strand material on the article.

3. A machine for winding strand material on an article comprising rotating means to support and rotate the article about a fixed axis, a carriage supported for movement in a given path relative to the fixed axis and the article between a starting position and a stopping position, a supply reel of the strand material rotated in a given direction by the pull of the material off the reel during winding of the material on the article, an induction motor mounted on the carriage with a shaft having the supply reel fixedly mounted thereon and adapted for counter-revolution operation with respect to the given direction of rotation of the supply reel to create a desired tension in the strand material, a distributor element mounted on and movable with the carriage to distribute the strand material on the article, a straight surface cam movable relative to the carriage, a follower supported by the carriage to engage the cam, and means to move the cam at a constant speed in synchronism with the rotary speed of the article to move the carriage to simultaneously move the distributor element, the tensioning motor and the supply reel to uniformly distribute the strand material on the article.

EDWARD A. HECKMAN.
JOHN J. KLING.

REFERENCES CITED

The following references are of record in the file of this patent:

UNITED STATES PATENTS

| Number | Name | Date |
|---|---|---|
| 665,015 | Kennedy | Jan. 1, 1901 |
| 1,753,950 | Sleeper | Apr. 8, 1930 |
| 2,326,307 | Peterson | Aug. 10, 1943 |